United States Patent [19]
Johnson

[11] Patent Number: 4,905,901
[45] Date of Patent: Mar. 6, 1990

[54] INJECTION MOLDING NOZZLE

[75] Inventor: Joe L. Johnson, Middlefield, Ohio

[73] Assignee: Sajar Plastics, Inc., Middlefield, Ohio

[21] Appl. No.: 238,893

[22] Filed: Aug. 30, 1988

[51] Int. Cl.$^4$ ............................................. B29D 27/00
[52] U.S. Cl. ..................................... 239/135; 239/408; 239/417; 264/328.7; 137/197
[58] Field of Search ...................... 239/132.1, 135, 139, 239/590, 407, 408, 416.4, 416.5, 417, 417.5, 462, 487; 251/126; 264/328.7, 328.8, 328.13; 137/197

[56] References Cited

U.S. PATENT DOCUMENTS

| | | | |
|---|---|---|---|
| 1,166,439 | 1/1916 | Corbin | 251/126 X |
| 2,776,671 | 1/1957 | Ferguson | 137/197 |
| 3,095,006 | 6/1963 | Smith | 251/126 |
| 3,841,354 | 10/1974 | McDonnell | 251/126 X |
| 4,042,660 | 8/1977 | Bishop | 264/328.8 X |
| 4,078,875 | 3/1978 | Eckhardt | 425/217 |
| 4,082,226 | 4/1978 | Appleman et al. | 251/62 |
| 4,140,672 | 2/1979 | Kataoka | 264/328.7 X |
| 4,376,625 | 3/1983 | Eckhardt | 425/564 |
| 4,427,361 | 1/1984 | Saito | 425/549 |
| 4,443,178 | 4/1984 | Fujita | 425/564 |
| 4,601,870 | 7/1986 | Sasaki | 264/572 |
| 4,657,496 | 4/1987 | Ozeki et al. | 425/130 |
| 4,681,528 | 7/1987 | Maruyama et al. | 425/562 |

FOREIGN PATENT DOCUMENTS 1929343 12/1970 Fed. Rep. of Germany .
51-50361 5/1976 Japan .

*Primary Examiner*—Andres Kashnikow
*Assistant Examiner*—Kevin P. Weldon
*Attorney, Agent, or Firm*—Fay, Sharpe, Beall, Fagan, Minnich & McKee

[57] ABSTRACT

A nozzle for injecting a viscous fluid, such as a molten plastic and a non-viscous fluid, such as a gas, includes a nozzle body having an inlet end, a discharge end and a flow passage for viscous fluid extending from the inlet end to the discharge end. A shut off valve device is provided for reciprocating in the nozzle body flow passage to control the flow of viscous fluid through the nozzle body discharge end. The shut off valve device includes a valve body and a non-viscous fluid flow passage provided in the valve body. A baffle device is located in the non-viscous fluid flow passage of the shut off valve for retarding a flow of viscous fluid in the non-viscous flow passage.

27 Claims, 6 Drawing Sheets

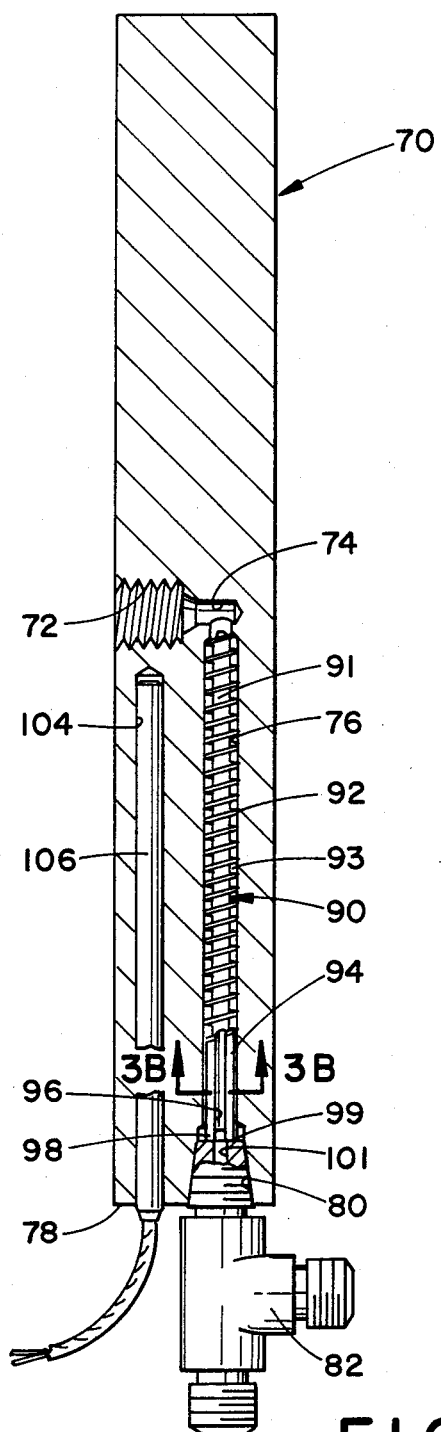
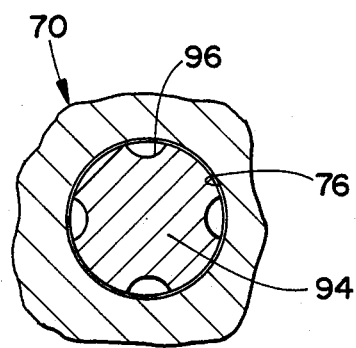
FIG. 3B
FIG. 3A

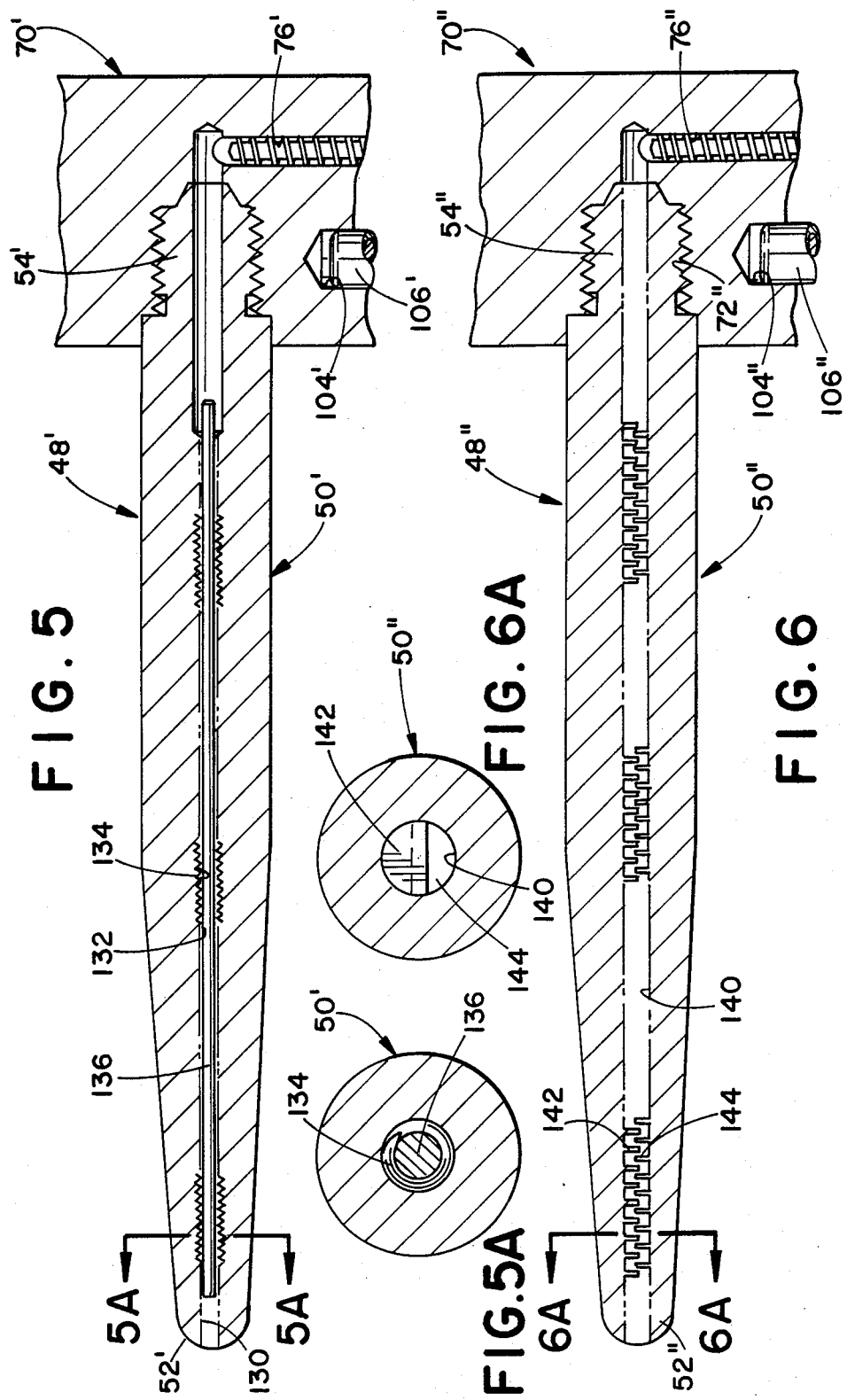

INJECTION MOLDING NOZZLE

BACKGROUND OF THE INVENTION

This invention generally pertains to an injection molding apparatus. More specifically, the present invention relates to an injection molding nozzle for such an injection molding apparatus.

The invention is particularly applicable to a nozzle for the injection of a viscous fluid, such as a molten plastic, and a non-viscous fluid, such as a gas, into an injection mold during a process such as gas augmented injection molding of plastic materials. However, it will be appreciated by those skilled in the art that the invention has broader applications and may also be adapted for use in many other injection molding environments where both a relatively viscous fluid, such as plastic or wax, and a relatively non-viscous fluid, such as gas, are injected into a mold cavity.

Injection molding processes have been widely used not only for the production of molded articles made of various thermoplastic resins but also for the production of lost wax masters used in the investment casting process. The solid injection molding process generally uses a thermoplastic material.

Solid injection molding employs the steps of injecting a plasticized (melted) thermoplastic material under high pressure into a finite mold space and then allowing the material to cool sufficiently so that it rehardens to the extent that it can retain its shape after removal from the mold. Thermoplastic materials, however, generally shrink during rehardening and, unfortunately, this shrinkage is exaggerated in heavier wall sections, bosses, ribs, gussets, etc. This usually results in sink marks and warpage in the molded product.

Packing the mold with more material by pressing the plastic material at a higher pressure into the mold is a common technique used to minimize such excessive shrinkage. However, packing builds internal stresses in the part and often cannot remove sink marks that are located away from the injection molding sprue or gate. Additionally, packing requires high clamp pressures between the parts of the mold body in order to prevent flashing of the plastic material.

Certain proposals have recently been made to fill the mold cavity with a plasticized thermoplastic material to a specific volume less than 100% of the mold space and utilize an inert gas injected under pressure into the partially plasticized material as it is cooling and rehardening. The gas enters the part and moves along paths of least resistance therein. Such paths are normally in areas where the thermoplastic body is thicker and has slower cooling sections, such as ribs, flow channels, chamfers, etc. In this way, with a suitably designed part, a continuous network of hollowed out sections can be provided. The material displaced by the gas from the middle of the sections moves out to fill the remainder of the mold space. This network of gas channels provides a uniform pressure distribution system throughout the mold space during part rehardening and cool down, thus minimizing internal stresses.

The outer surfaces of thicker sections do not sink because gas has cored them out from the inside and gas pressure holds the plastic material up against the mold surfaces during rehardening. Sink in these sections takes place internally rather than on the exterior surfaces of the part. Since the pressure used for final filling of the part is confined to an area defined by the system of gas flow channels, the resultant force against the sections of the mold is relatively modest so that lower clamping forces on the mold are adequate.

Various types of shut off nozzles for injection molding fluid plastics or wax are known. However, most of these are not adapted for the injection of both a viscous fluid, such as a thermoplastic material and non-viscous fluid, such as a gas, into a mold cavity. Most of those nozzles which are so adapted, do not discharge the gas back through the nozzle when discharge of the gas is required. Instead, in these nozzle systems, the nozzle is spaced away from the mold body in order to vent the gas pressure within the mold cavity. Even those nozzles which are adapted to vent the gas back through the nozzle are unsatisfactory because the molten plastic remaining in the nozzle or in the mold space is frequently vented back along with the gas. This can be deleterious to the gas lines in the nozzle and to the gas piping and valves downstream from the nozzle. Also, if such plastic solidifies in the gas lines in the nozzle, the nozzle becomes unusable until it is cleaned out, which is a time consuming, difficult, and expensive process.

Accordingly, it has been considered desirable to develop a new and improved injection molding nozzle which would overcome the foregoing difficulties and others while providing better and more advantageous overall results.

BRIEF SUMMARY OF THE INVENTION

In accordance with the present invention, a new and improved nozzle is provided for injecting a viscous fluid and a non-viscous fluid.

More particularly in accordance with the invention, the nozzle comprises a nozzle body having a inlet end, a discharge end, and a flow passage for a viscous fluid extending from the inlet end to the discharge end. A shut off valve means is provided for reciprocating in the nozzle body flow passage to control a flow of viscous fluid through the nozzle body discharge end. The shut off valve means comprises a valve body having a non-viscous fluid flow passage provided therein and a baffle means. The baffle means is located within the non-viscous fluid flow passage for retarding a flow of viscous fluid in the nonviscous fluid flow passage.

In accordance with another aspect of the invention, the nozzle body further comprises a torpedo disposed in the nozzle body flow passage and secured to the nozzle body. The torpedo comprises a front portion, a rear portion, and an aperture provided in the front portion for holding at least a portion of the valve body. The torpedo aperture is aligned with the nozzle body discharge end.

According to still another aspect of the invention, the valve body comprises pin having a first end and a second end with a first bore extending from the pin first end to the pin second end. A rod is provided to which the second end of the pin is fastened. The rod has a second bore which communicates with the first bore in the pin. The baffle means is disposed in at least one of the first bore in the pin and second bore in the rod.

According to yet another aspect of the invention, the nozzle further comprises a heating means for heating the valve body of the shut off valve means. Preferably, the heating means comprises a cartridge heater positioned in a bore in the valve body.

According to still yet another aspect of the invention, the baffle means comprises a bluff body, having first and second ends, which is adapted for selective insertion in the valve body non-viscous fluid passage. The bluff body, and an inner wall of the non-viscous fluid passage, form a tortuous flow path between the bluff body ends.

In accordance with a further aspect of the invention, the bluff body includes an outer periphery and a helically extending rib located on the outer periphery. The bluff body is so sized that it can be inserted into the fluid flow passage such that a radially outer edge of the rib pattern contacts a wall surface of the flow passage thereby restricting all fluid flow to a helical path around the bluff body.

In accordance with a still further aspect of the invention, the bluff body can include an outer periphery having at least one groove formed therein and extending between the ends of the body. The bluff body is so sized that its outer periphery contacts a wall surface of the flow passage and thereby restricts fluid flow to a path defined by the at least one groove in the bluff body outer periphery.

In accordance with a yet further aspect of the invention, the bluff body includes at least two spaced helically fluted sections each including at least two spaced flutes. A radially outer edge of each flute contacts a wall surface of the flow passage thereby restricting fluid flow to a path defined between the at least two flutes in each section.

Alternatively, the baffle means can comprise a helical channel spiraling along a wall of the fluid flow passage for at least a portion thereof and a bluff body located in the fluid flow passage. The bluff body has a smooth circumferential wall of an outer diameter such that the circumferential wall contacts the wall of the flow passage. In this way, all flow through the flow passage is directed along the helical channel.

As yet another alternative, the baffle means can comprise a plurality of flanges which can extend into the fluid flow passage in a direction normal to a longitudinal axis of the flow passage. Each of the flanges closes off a different section of the flow passage than each adjacent one of the flanges to create a tortuous flow path through the flow passage.

In accordance with a still further aspect of the invention, the nozzle further comprises a means for selectively urging the shut off valve means valve body in a first direction so as to close the nozzle body discharge end. Preferably, the means for urging comprises a piston including a rod that is adapted for contacting the valve body and a cylinder in which the piston can reciprocate. The piston rod extends out of the cylinder. The means for urging further comprises a source of pressurized fluid for actuating the piston.

One advantage of the present invention is the provision of a new and improved nozzle for injection molding.

Another advantage of the present invention is the provision of a nozzle which is capable of controlling the flow of a viscous fluid, such as a molten plastic, into a mold cavity and of a non-viscous fluid, such as a gas, into the mold cavity and venting the non-viscous fluid out of the mold cavity.

Still another advantage of the present invention is the provision of a nozzle having a shut off valve that has a non-viscous fluid flow passage therein and a baffle means located in the fluid flow passage for retarding any flow of viscous fluid, such as molten plastic, in the non-viscous fluid flow passage. The baffle means can be a bluff body which is selectively removable from the valve body flow passage.

Yet another advantage of the present invention is the provision of a nozzle having a shut off valve for controlling the flow of a molten plastic through the nozzle and a heating means for heating the valve in order to prevent any solidification of molten thermoplastic in a gas flow inlet and exhaust bore extending in the shut off valve.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 3A is an enlarged top plan view in cross-section through a rod portion of a valve body of a shut off valve means of the nozzle of FIG. 1;

FIG. 3B is an enlarged cross-sectional view through the rod of FIG. 3A along lines 3B—3B;

FIG. 5 is a cross-sectional view through a first alternate embodiment of a valve body of a nozzle according to the present invention;

FIG. 5A is an enlarged cross-sectional view of the valve body of FIG. 5 along lines 5A—5A;

FIG. 6 is a cross-sectional view through a second alternate embodiment of a valve body of a nozzle according to the present invention;

FIG. 6A is an enlarged cross-sectional view of the valve body of FIG. 6 along lines 6A—6A;

DETAILED DESCRIPTION OF THE PREFERRED AND ALTERNATE EMBODIMENTS

Figure 1:
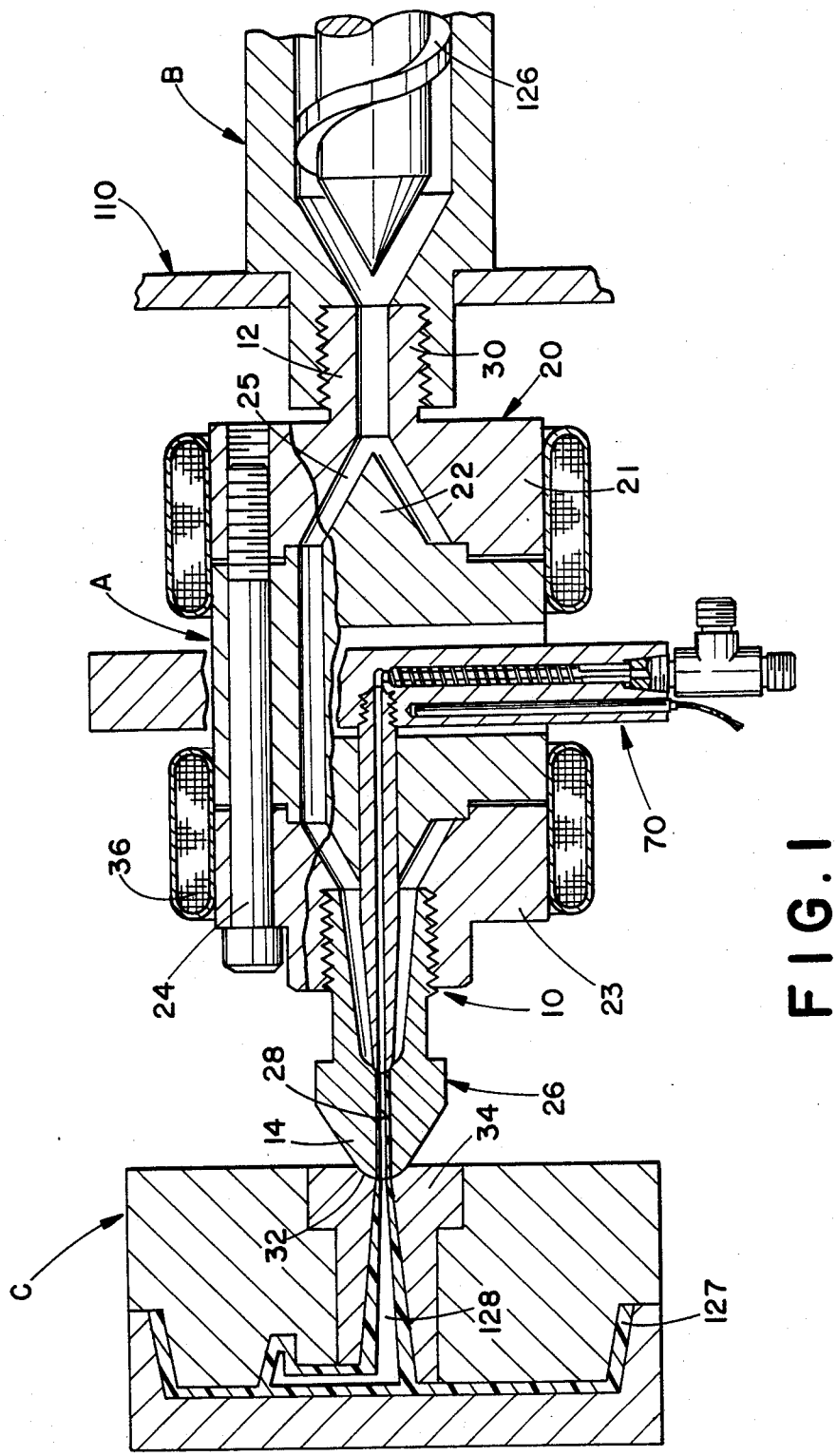
FIG. 1 is a top plan view in cross-section, with a portion shown out of its normal location, of an injection nozzle according to a first preferred embodiment of the present invention, secured between a mold body and an injection molding apparatus.

Referring now to the drawings, wherein the showings are for purposes of illustrating preferred and alternate embodiments of the invention only and not for purposes of limiting same, FIG. 1 shows the subject new nozzle A located between an injection molding machine B and a mold body C. While the nozzle is primarily designed for and will hereinafter be described in connection with an apparatus used for the injection molding of a molten thermoplastic with a gas, it should be appreciated that the nozzle can also be used in various other molding environments in which a relatively viscous fluid and a relatively non-viscous fluid are injected, such as for the production of lost wax masters and the like.

The nozzle A comprises a nozzle body 10 having an inlet end 12 and a discharge end 14. The nozzle includes a housing 20 that is made of three sections, a rear section 21, a central torpedo-shaped section 22, and a forward section 23 which are secured together by suitable fasteners 24 (only one of which is illustrated in FIG. 1). At least one flow channel 25 extends longitudinally through all the sections of the housing 20. A tip 26 is threadedly secured to the housing forward section 23 to form the discharge end 14 of the nozzle body 10. A suitable flow channel 28, that is provided in the tip 26, communicates with the flow channel 25 in the housing 20.

A suitable threaded section 30 is provided on the inlet end 12 of the nozzle body 10, namely the rear housing section 21, so that the nozzle can be threadedly fastened to the injection molding machine B. A blunt face 32 is provided on the forward end of the tip 26 to allow the tip to cooperate with a sprue bushing section 34 of the mold body C.

Also provided on the nozzle body 10 is at least one conventional heater coil 36 for heating the housing 20 to keep the thermoplastic material therein in a molten state. Two such heater coils are disclosed as being used on the nozzle body of FIG. 1, although any suitable number could be provided as needed.

Figure 2:
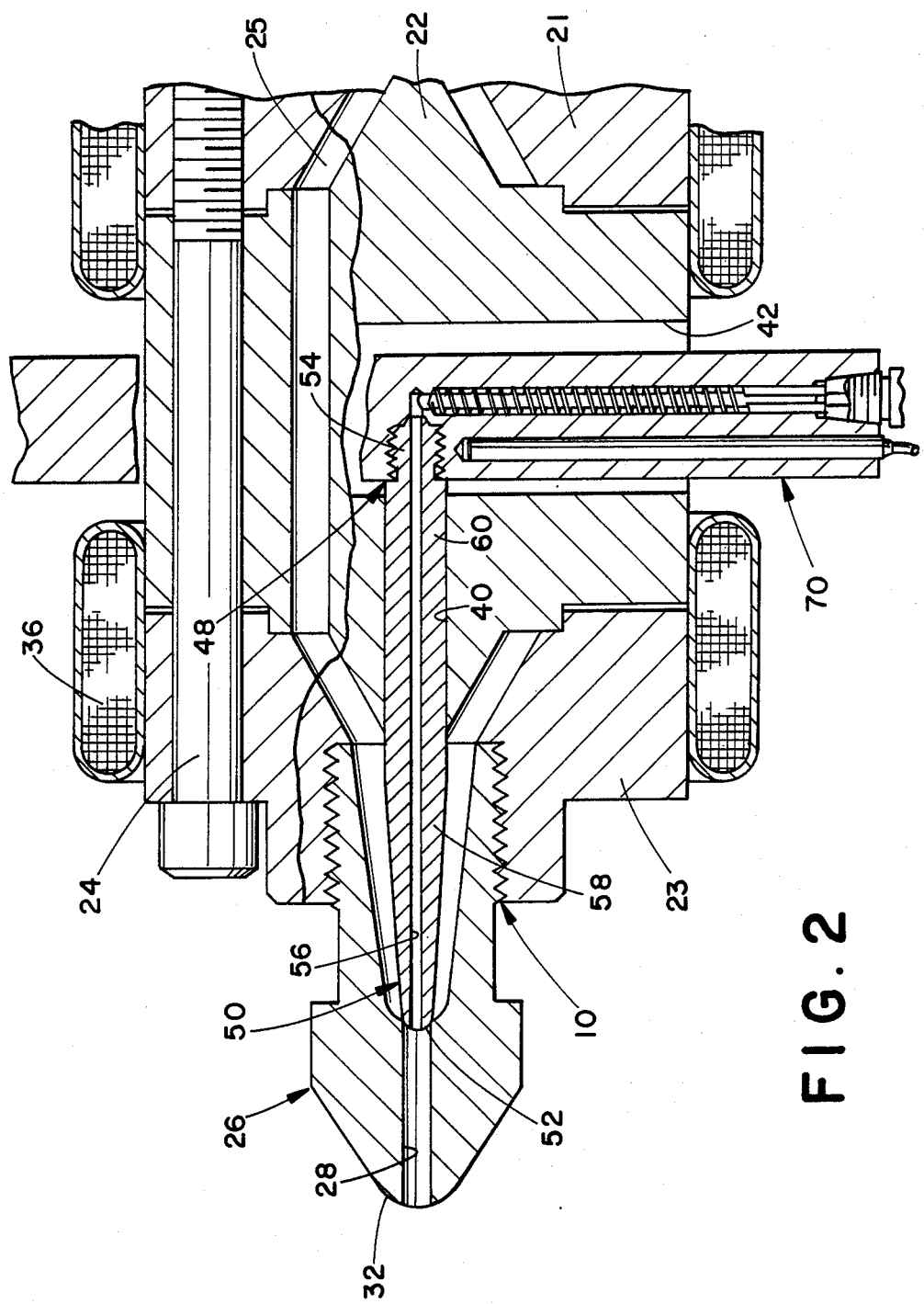
FIG. 2 is an enlarged top plan view in cross-section of a front portion of the injection nozzle of FIG. 1.

With reference now to FIG. 2, the torpedo section 22 includes a first aperture 40 extending thereinto, in an orientation which is co-axial with the flow channel 28 in the tip 26, and a second aperture 42 which is transverse to the first aperture and extends through the opposing side walls of the torpedo 22. The first aperture 40 extends from a forward tip of the torpedo section 22 to the second aperture 42.

A valve body 48 is adapted to reciprocate in the nozzle body 10. For this purpose, a pin 50 of the valve body is reciprocally mounted in the torpedo section first aperture 40. The pin has a rounded first end 52 and a threaded second end 54. A longitudinal aperture 56 extends between the first and second ends. The pin 50 also preferably has a tapered first section 58 which extends out of the torpedo section 22 and a substantially right cylindrical second section 60 that is housed in the aperture 40.

The second end 54 of the pin 50 can be selectively fastened into a cross-piece or rod 70. With reference now also to FIG. 3A, a threaded transverse bore 72 is provided in the rod for cooperation with the pin threaded end 54. A bore extension 74 communicates with the transverse bore 72 and with a longitudinally oriented bore 76 which extends in the rod to a first end 78 thereof. The bore 76 is provided, adjacent the rod first end 78, with a threaded section 80 in which a fitting 82 can be secured.

A baffle means is positioned in the longitudinal bore 76 of the rod 70 to retard viscous fluid flow therethrough. In this embodiment, the baffle means comprises a substantially right cylindrical bluff body 90, that is provided on a first section 91 thereof with a helically extending rib or thread 92 on at least a portion of its exterior periphery. The bluff body is so sized that it can be inserted in the passage 76 such that a radially outer edge of the rib pattern 92 contacts a wall surface of the bore 76. As a result, the flow of fluid is restricted to a helical path 93 that is defined by the rib pattern 92 between the bluff body 90 and the wall of the bore 76.

The provision of a baffle means in the flow passage makes for a greatly increased flow length and a decreased flow path diameter for any molten thermoplastic material which may attempt to flow back into the shut off valve means, through the pin longitudinal bore 56 and into the rod longitudinal bore 76. As is well known, thermoplastics reversibly melt at raised temperatures to become highly viscous liquids that are very resistant to flow. Because molten thermoplastics are so viscous, they will have difficulty flowing through the small diameter tortuous passage formed by the helically spiraling flow path 93. In contrast, gases in general offer substantially less resistance to flow and are considered to be much less viscous. Gas, because it is substantially less viscous, will have little difficulty in flowing through path 93.

If desired, the bluff body 90 can also be provided with a second section 94 which has a larger diameter than the first section 91. With reference now also to FIG. 3B, the second section can have a diameter which is so sized as to just fit in the passage 76. Longitudinally extending grooves 96 of a small radius can be cut into the second section 94 to communicate the helically extending passageway 93 with the fitting 82. The pitch of the helical thread 92 can be suitably varied depending upon the type of thermoplastic material which is meant to be injected. The length of a second section 94 can also be varied depending upon the type of thermoplastic meant to be injected. In fact, the presence of such a second section 94 can be dependent on the type of thermoplastic meant to be injected. In any case, what is required is the provision of a baffle means which will successfully prevent the thermoplastic material from flowing completely through the rod longitudinal bore 76 and into the fitting 82.

The bluff body 90 is held in place in the passage 76 by a cooperation of rearward extensions 98 of the body 90 with a forward face 99 of the fitting 82 as is evident from FIG. 3A. The extensions 98 are so configured as to allow a flow of gas from a bore 101 of the fitting 82 into the grooves 96 of the body 90 and hence into the flow path 93.

Tests have disclosed that the use of a bluff body of the type disclosed herein positioned in the longitudinal bore of a rod has prevented the back flow of molten thermoplastic material completely through the valve body bore and into a fitting secured thereto.

In order to keep any molten thermoplastic material which flows into the bore 76 in a molten condition, a suitable heating means can be provided in the rod 70. In this connection, a bore 104 can extend in the rod 70 adjacent to the longitudinal bore 76 and substantially parallel therewith. Located in the bore 104 is a suitable heater cartridge 106 which heats the section of the rod in which the longitudinal bore 76 extends in order to prevent any possible cooling down, and thus solidification, of molten thermoplastic material which may flow into the longitudinal bore 76. It is noted that a separate heating means is needed for the rod 70 since it extends away from the housing 20 and thus may not be adequately heated by the heating coils 36 encircling the housing.

Figure 4:
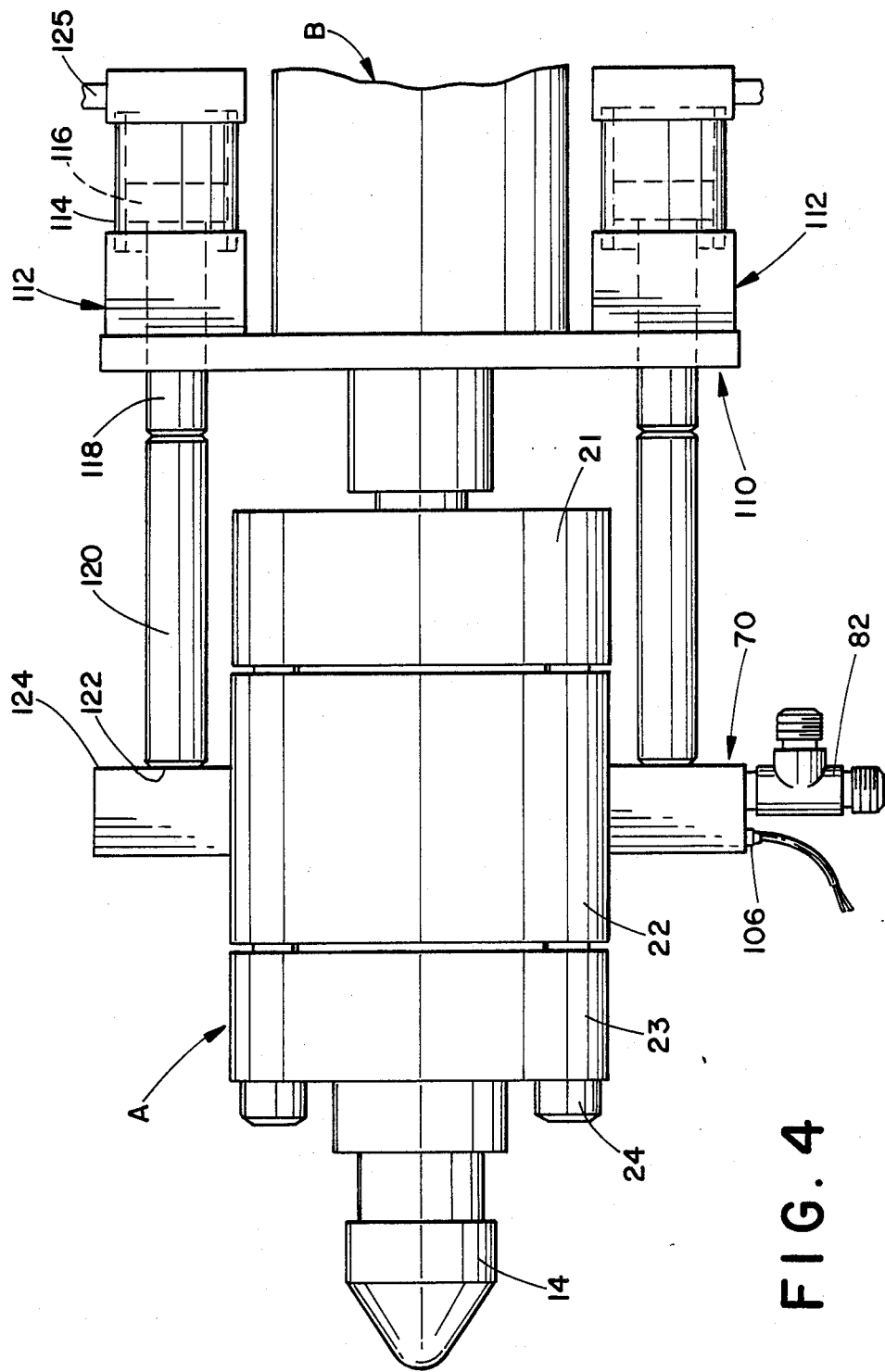
FIG. 4 is an enlarged top plan view of the nozzle of FIG. 1 secured to the injection molding apparatus.

With reference now to FIG. 4, the nozzle preferably further comprises a means for selectively urging the valve body 48 (not visible in this Figure) in a first direction so as to close the nozzle body discharge end 14. The means for selectively urging is secured to a plate 110 that is, in turn, secured to the injection molding machine B in a suitable manner. The means for urging comprises a pair of cylinder assemblies 112, only one of which will be discussed herein, it being appreciated that the other assembly is identically constructed. The cylinder assembly 112 includes a cylinder 114 having a piston 116 that can reciprocate therein. A rod 118 is secured at one end to the piston and extends out of the cylinder and through the plate 110 through suitable apertures therein, as illustrated. A rod extension 120 is secured in a suitable manner to a free end of the rod 118. A front face 122 of the rod extension 120 is adapted to selectively contact a side surface 124 of the rod 70 of the valve body 48 to urge the rod 70, and hence the entire valve body, forward, i.e. in the direction illustrated in FIG. 2 so as to close the discharge end 14 of the nozzle A.

The cylinder assembly 112 is preferably a one way cylinder so that when fluid pressure is vented from behind the piston 116, through an inlet and outlet conduit 125, the valve body 48 can be urged in a reverse direction, i.e. away from the discharge end 14. This is done through the exertion of pressure by a suitable thermoplastic feeding means, such as a screw 126 (FIG. 1) provided in the injection molding machine B. The pressurized thermoplastic acts on the tapered first section 58 of the pin 50 so as to urge the pin rearwardly thereby also urging the valve rod 70 in a rearward direction. Because fluid pressure is no longer being exerted on the second side of the piston 116, the rod extension 120 will not resist the rearward movement of the valve rod 70 and hence the valve will open.

When the cylinder assembly 112 is pressurized, the valve 48 urged forwardly to mate with the tip 26 and prevent any further flow of thermoplastic material. Gas, however, can continue to flow into the mold body C through the bores 76, 74, 56 and into the mold body. In this way, a plastic part 127 is formed with a gas channel 128 therein (as is shown in FIG. 1). However, a reverse flow of molten thermoplastic back through the valve 48 is prevented by the baffle means as described hereinabove.

With reference now also to FIG. 5, a first alternate embodiment of a baffle means according to the present invention is there illustrated. For ease of illustration and appreciation of this alternative, like components are identified by like numerals with a primed (') suffix and new components are identified by new numerals.

In this FIGURE, a valve body 48' is provided with a pin 50' that is threadable into a rod 70'. A longitudinal bore 130 extends through the pin 50' from adjacent its rounded first end 52' to adjacent its threaded second end 54'. In this embodiment, the baffle means comprises a bore wall 132 of the pin 50' which wall is provided with a helically extending thread pattern 134 that is cut into the wall's periphery. As illustrated in FIG. 5A, a bluff body or plug member 136 is positioned in the bore and is so sized that an exterior periphery of the plug contacts a crown portion of each thread to keep the plug in place. In this way, all fluid flow through the bore 130 is constrained to flow through the small diameter helical path formed between the plug body 136 and the helical thread pattern 134 in the bore wall 132 of the pin 50', as is illustrated in FIG. 5A. Thus, a baffle means is provided to retard any flow of molten thermoplastic material back into the pin bore. However, the flow of gas through the bore 130 is not significantly limited since gas is substantially less viscous than thermoplastics and would not be significantly retarded in its flow by the tortuous flow path provided.

If desired, a baffle means similar to one illustrated in FIGS. 1–3 can be provided in a longitudinal bore 76' of the rod 70' (as illustrated) if a longer tortuous path is considered necessary for the particular environment in which the valve body 48' is meant to be used. Alternatively, a baffle means of the type described hereinabove in the pin 50' could be provided in the rod 70' if that is desired. Also, a heater cartridge 106' can be provided in a bore 104' of the rod 70', if desired.

With reference now also to FIG. 6, a second alternate embodiment of a valve body baffle means according to the present invention is there illustrated. For ease of illustration and appreciation of this alternative, like components are identified by like numerals with a double primed ('') suffix and new components are identified by new numerals.

In this embodiment, a valve body 48'' includes a pin section 50'' that is threaded into a rod section 70''. The pin section has a longitudinally extending bore 140 that extends from adjacent a rounded first end 52'' of the pin to adjacent a threaded second end 54'', by which the pin is secured in a threaded bore 72'' which extends into the rod 70''. Located in the bore 140 is a baffle means for retarding the flow of molten thermoplastic material back through the bore. The baffle means in this embodiment comprises a series of spaced planar upper baffle elements 142 and lower baffle elements 144 which extend towards each other in an intermeshing arrangement. The baffle elements 142, 144 can extend substantially normal to the bore 140, if desired, or at a suitable angle to the bore. Each of the elements extends for more than half the diameter of the flow path as is illustrated in FIG. 6A so that fluid flow is constrained to move in a tortuous path through the baffle means. This design of a pin 50'' can be constructed by suitably machining or casting baffle elements on each half of a longitudinally split pin, separated along the aperture 140, and then securing the pin halves together to form the entire pin.

If desired, a similar baffle means, or a baffle means according to one of the other embodiments discussed hereinabove, can also be provided in the rod 70'' if that is considered necessary (a baffle means according to FIGS. 1–3 is illustrated). Also, the rod 70'' can be provided with a longitudinal aperture 104'' in which a suitable heater cartridge 106'' can be located, if considered necessary.

Figure 7:
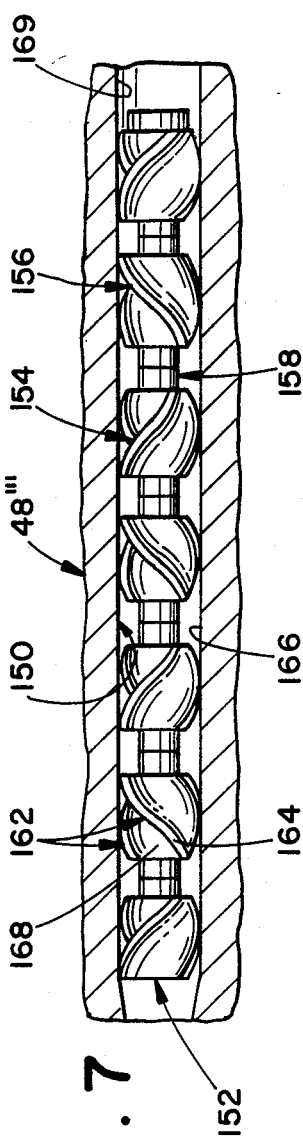
FIG. 7 is a cross-sectional view through a second preferred embodiment of a portion of a baffle means for a valve body of a nozzle according to the present invention; and, FIG. 8 is a perspective view of a portion of a baffle means according to a third preferred embodiment of the present invention.

A second preferred embodiment of the present invention is illustrated in FIG. 7. For ease of illustration and appreciation of this alternative, like components are identified by like numerals with a triple (''') primed suffix and new components are identified by new numerals.

In this FIGURE, a valve body 48''' includes a longitudinal bore 150 which extends through the valve body and in which is positioned a bluff body 152. In this embodiment, the bluff body is comprised of a plurality of fluted sections 154, 156 which are separated by smaller diameter connecting portions 158. Each fluted section includes a plurality of spaced helically curving flutes 162 which have on a radially outward face thereof a peripheral wall 164 which is so dimensioned as to contact an interior Wall 166 of the valve body bore 150. Between each two flutes 162 is a groove 168.

As mentioned, the fluted sections 154, 156 are so sized that the exterior peripheral wall 164 of each flute 162 contacts the interior periphery 166 of the bore 150. In this way, all fluid flow through the bore 150 is constrained to flow through the grooves 168 located between the flutes. Thus, a baffle means is provided to retard any flow of molten thermoplastic material back into the pin bore. However, the flow of gas through the bore 150 is not significantly limited since gas is substantially less viscous than thermoplastics and would not be significantly retarded in its flow by the tortuous flow path provided.

It is noted that the helices of each fluted section are preferably reversed from each adjoining fluted section so as to further retard the flow of molten thermoplastic material back through the baffle means.

If desired, seven such fluted sections can be provided on the bluff body 152. As is conventionally known, each of the fluted sections could be detached from the bluff body 152 so that more or less than the illustrated number of sections could be utilized in the bore 150 of the valve body 48′″. In this way, individual segments could be replaced as necessary or a longer or shorter bluff body 152 could be provided.

It is also noted that the entire body 152 can be removed for cleaning if the plastic material flows into the baffle means and solidifies therein. Such removal can be done through a rear opening 169 of the valve body 48′″ as is illustrated in FIG. 7.

It should also be appreciated that such a bluff body 152 could also be provided in the flow passage of the rod (not illustrated in this embodiment) if that were considered necessary.

Figure 8:
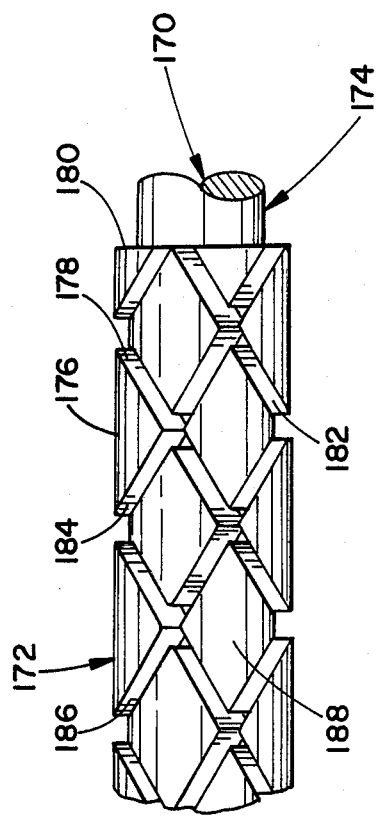

With reference now to FIG. 8, a yet further type of baffle means according to a third preferred embodiment of the present invention is there illustrated. In this embodiment, the baffle means comprises a bluff body 170 which includes a first section 172 of a first diameter and a second section 174 of a second, and smaller diameter. Located on an outer peripery 176 of the first section 172 is at least one groove 178 which extends from one end 180 of the first section to a second end thereof (not visible).

In the illustrated design, two such grooves 178, 182 are illustrated as extending parallel to each other in a first direction and two such grooves 184, 186 are illustrated as extending parallel to each other in a second direction so as to form a so called pineapple design on the bluff body 170. In such a design, the grooves separate the exterior periphery 176 of the bluff body 170 into a plurality of discrete diamond-shaped blocks 188. As with the embodiment of FIG. 7, the entire bluff body is an insert which can be inserted into and removed from the valve body non-viscous fluid passage (not illustrated) for cleaning purposes or for replacement purposes should that become necessary.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A nozzle for injecting a viscous fluid and a non-viscous fluid, comprising:
   a nozzle body having an inlet end, a discharge end and a flow passage for viscous fluid extending from said inlet end to said discharge end; and,
   a shut off valve means for reciprocating in said nozzle body flow passage to control a flow of viscous fluid through said nozzle body discharge end, said shut off valve means comprising:
   a valve body,
   a non-viscous fluid flow passage provided in said valve body, and
   a baffle means located in said non-viscous fluid flow passage for retarding a flow of viscous fluid in said non-viscous fluid flow passage.

2. The nozzle of claim 1 further comprising a torpedo disposed in said nozzle body flow passage and secured to said nozzle body, said torpedo comprising:
   a front portion;
   a rear portion; and,
   an aperture provided in said front portion for holding at least a portion of said valve body, wherein said torpedo aperture is aligned with said nozzle body discharge end.

3. The nozzle of claim 1 wherein said valve body of said shut off valve means comprises:
   a pin having a first end and a second end, a first bore extending from said pin first end to said pin second end; and,
   a rod to which said second end of said pin is fastened, said rod having a second bore which communicates with said first bore in said pin and wherein said baffle means is disposed in at least one of said first bore in said pin and said second bore in said rod.

4. The nozzle of claim 1 further comprising a heating means for heating said valve body of said shut off valve means.

5. The nozzle of claim 4 wherein said heating means comprises a cartridge heater positioned in a bore in said valve body.

6. The nozzle of claim 1 wherein said baffle means comprises a bluff body having a first end and a second end, said bluff body being of suitable size and shape so that it can be selectively positioned in said valve body nonviscous fluid passage, said bluff body cooperating with an inner wall of said non-viscous fluid passage to form a tortuous fluid flow path.

7. The nozzle of claim 6 wherein said bluff body has an outer periphery and includes a helical rib extending radially outwardly from said bluff body outer periphery, wherein said bluff body is so sized that a radially outer, edge of said rib contacts a wall surface of said non-viscous flow passage, thereby restricting fluid flow to a helical path defined by said rib between said bluff body and said inner wall of said non-viscous fluid flow passage.

8. The nozzle of claim 6 wherein said bluff body has an outer periphery and includes at least one groove formed in said outer periphery and extending from said bluff body first end to said bluff body second end, wherein said bluff body is so sized that its outer periphery contacts a wall surface of said non-viscous flow passage and thereby restricts fluid flow to a path defined by said at least one groove in said bluff body outer periphery.

9. The nozzle of claim 6 wherein said bluff body includes at least two spaced helically fluted sections each including at least two spaced flutes, wherein a radially outer edge of each flute contacts a wall surface of said non-viscous flow passage thereby restricting fluid flow to a path defined between said at least two flutes.

10. The nozzle of claim 9 wherein said at least two spaced fluted sections are connected by a rod portion having a smaller diameter than said fluted sections.

11. The nozzle of claim 9 wherein said at least two flutes of one of said at least two spaced fluted sections have a helical spiral which is reversed with respect to a helical spiral of said at least two flutes of another of said at least two spaced fluted sections.

12. The nozzle of claim 1 wherein said baffle means comprises:
a helical channel sunk into a wall of said fluid non-viscous flow passage and spiraling therealong for at least a portion thereof; and,
a bluff body having a smooth circumferential wall of an outer diameter such that said circumferential wall contacts said wall of said non-viscous flow passage so that all flow through said non-viscous flow passage occurs through said helical channel.

13. The nozzle of claim 1 wherein said baffle means comprises a plurality of elements extending into said non-viscous flow passage in a direction at an angle to a longitudinal axis of said non-viscous flow passage, wherein each of said elements closes off a different section of said non-viscous flow passage than each adjacent one of said elements to create a tortuous non-viscous flow path through said flow passage.

14. The nozzle of claim 13 wherein each of said elements extends for more than half the diameter of said non-viscous flow passage in an intermeshing arrangement.

15. The nozzle of claim 1 further comprising a means for selectively urging said shut off valve means valve body in a first direction so as to close said nozzle body discharge end.

16. The nozzle of claim 15 wherein said means for urging comprises:
a piston including a rod adapted for contacting said valve body;
a cylinder in which said piston can reciprocate, said piston rod extending out of said cylinder; and,
a source of pressurized fluid for actuating said piston.

17. An injection molding nozzle that supplies a molten plastic and a gas to an injection mold, comprising:
a nozzle body including an inlet end, a discharge end, and a flow passage therebetween; and,
a shut off valve means movably mounted in said nozzle body flow passage for controlling a flow of a molten plastic through said nozzle body flow passage, said shut off valve means comprising:
a pin having a first end and a second end, a first bore extending from said pin first end to said pin second end, wherein a longitudinal axis of said pin is coaxial with a longitudinal axis of said nozzle body,
a rod to which a second end of said pin is fastened, said rod having a second bore which communicates with said pin first end, said rod extending in a direction substantially normal to said pin, and
a baffle means, located in at least one of said pin first bore and said rod second bore, for retarding a flow of molten plastic in said first and second bores.

18. The nozzle of claim 17 further comprising a torpedo disposed in said nozzle body flow passage and secured to said nozzle body, said torpedo comprising:
a body portion;
a longitudinally extending aperture provided in said body portion for housing said shut off valve means pin, said aperture being aligned with said nozzle body discharge end; and,
a transverse aperture provided in said body portion for housing a central portion of said shut off valve means rod.

19. The nozzle of claim 17 further comprising a heating means for heating said rod in order to keep molten any plastic which flows into said rod second bore.

20. The nozzle of claim 17 further comprising a means for selectively urging said shut off valve means in a first direction in order to close said nozzle body discharge end.

21. A nozzle for injecting a viscous fluid and a non-viscous fluid, comprising:
a nozzle body having an inlet end adapted for connection to an associated injection molding machine, a discharge end adapted for connection to an associated injection mold and a flow passage for viscous fluid extending from said inlet end to said discharge end;
a plug body disposed in said nozzle body flow passage, said plug body having a forwardly opening axial bore and opposed axially elongate slots communicating with said axial bore;
a shut off valve mechanism reciprocable in said plug body bore for controlling the flow of viscous fluid through said nozzle body discharge end, comprising:
a valve stem slidably positioned in said plug body axial bore,
a cross link rod, a central section of which is received in said plug body opposed slots, wherein one end of said valve stem is secured to said cross link rod,
a non-viscous fluid flow passage provided in said valve stem and cross link rod, and
a baffle means located in said non-viscous fluid flow passage for retarding a flow of viscous fluid into said non-viscous fluid flow passage; and,
a cylinder means for selectively urging said shut off valve mechanism to one end position.

22. The nozzle of claim 21 wherein said baffle means comprises a bluff body having first and second ends, said bluff body being adapted for selective insertion in said shut off valve mechanism non-viscous fluid flow passage, said bluff body forming with an inner wall of said non-viscous fluid flow passage a tortuous fluid flow path from said bluff body first end to said bluff body second end.

23. The nozzle of claim 22 wherein said bluff body includes an outer periphery and a helically spiraling rib extending radially outwardly of said outer periphery, wherein radially outer edge of said bluff body rib contacts said inner wall surface of said non-viscous flow passage.

24. The nozzle of claim 21 wherein said baffle means comprises a bluff body having first and second ends and an outer periphery therebetween with at least one groove extending along said outer periphery from said first end to said second end, wherein said bluff body is so sized that its outer periphery contacts a wall surface of said flow passage and thereby restricts fluid non-viscous flow to a path defined by said at least one groove in said bluff body outer periphery.

25. The nozzle of claim 21 wherein said baffle means comprises at least two spaced helically fluted sections each including at least two spaced flutes, wherein a radially outer edge of each flute contacts a wall surface of said non-viscous flow passage thereby restricting fluid flow to a path defined between said flutes.

26. The nozzle of claim 21 wherein said baffle means comprises:
- a helical channel cut into an inner wall of said non-viscous fluid flow passage and spiraling along at least a portion thereof; and,
- a bluff body having a smooth circumferential wall of an outer diameter such that said circumferential wall contacts said wall of said non-viscous flow passage so that all flow through said non-viscous flow passage occurs along said helical channel.

27. The nozzle of claim 21 wherein said baffle means comprises a plurality of flanges extending into said non-viscous flow passage in a direction substantially normal to a longitudinal axis of said non-viscous flow passage, wherein each of said flanges blocks a different section of said non-viscous flow passage than each adjacent one of said flanges to create a tortuous flow path through said non-viscous flow passage.

* * * * *